US011135553B2

(12) United States Patent
Miyahara et al.

(10) Patent No.: US 11,135,553 B2
(45) Date of Patent: Oct. 5, 2021

(54) POROUS SUPPORT, METHOD FOR MANUFACTURING POROUS SUPPORT, SEPARATION MEMBRANE STRUCTURE, AND METHOD FOR MANUFACTURING SEPARATION MEMBRANE STRUCTURE

(71) Applicant: NGK INSULATORS, LTD., Nagoya (JP)

(72) Inventors: Makoto Miyahara, Tajimi (JP); Kenji Yajima, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 147 days.

(21) Appl. No.: 16/123,254

(22) Filed: Sep. 6, 2018

(65) Prior Publication Data
US 2019/0001278 A1    Jan. 3, 2019

Related U.S. Application Data

(63) Continuation of application No. PCT/JP2017/009234, filed on Mar. 8, 2017.

(30) Foreign Application Priority Data

Mar. 31, 2016 (JP) .............................. JP2016-072611

(51) Int. Cl.
*B01D 69/10* (2006.01)
*C04B 38/00* (2006.01)
(Continued)

(52) U.S. Cl.
CPC ........... *B01D 69/10* (2013.01); *B01D 53/228* (2013.01); *B01D 67/0006* (2013.01);
(Continued)

(58) Field of Classification Search
CPC ...... B01D 69/10; B01D 69/105; B01D 69/12; B01D 2257/504; B01D 2256/245;
(Continued)

(56) References Cited

U.S. PATENT DOCUMENTS 6,225,246 B1 *  5/2001  Darcovich ......... B01D 39/2075
                                                    210/500.21
10,391,454 B2 *  8/2019  Miyahara ........... B01D 67/0046
(Continued)

FOREIGN PATENT DOCUMENTS

JP    2005-081246 A1    3/2005
JP    2009-220039 A1   10/2009
(Continued)

OTHER PUBLICATIONS

Machine Translation of WO2015146354, published Oct. 1, 2015 (Year: 2015).*
(Continued)

*Primary Examiner* — Joseph W Drodge
(74) *Attorney, Agent, or Firm* — Burr & Brown, PLLC

(57) ABSTRACT

A porous support includes a base body, a supporting layer, and a topmost layer. The supporting layer is disposed between the base body and the topmost layer, and makes contact with the topmost layer. A ratio of a porosity of the topmost layer to a porosity of the supporting layer is greater than or equal to 1.08. A ratio of a thickness of the topmost layer to a thickness of the supporting layer is less than or equal to 0.9.

2 Claims, 4 Drawing Sheets

(51) Int. Cl.
*B01D 71/02* (2006.01)
*C04B 41/89* (2006.01)
*B01D 53/22* (2006.01)
*C04B 41/52* (2006.01)
*C04B 41/00* (2006.01)
*B01D 69/12* (2006.01)
*C04B 41/85* (2006.01)
*B01D 67/00* (2006.01)
*B01D 69/04* (2006.01)
*B01D 69/08* (2006.01)
*C04B 111/00* (2006.01)

(52) U.S. Cl.
CPC ........... *B01D 69/12* (2013.01); *B01D 71/025* (2013.01); *B01D 71/028* (2013.01); *C04B 38/00* (2013.01); *C04B 38/0006* (2013.01); *C04B 41/009* (2013.01); *C04B 41/52* (2013.01); *C04B 41/85* (2013.01); *C04B 41/89* (2013.01); *B01D 67/0041* (2013.01); *B01D 69/04* (2013.01); *B01D 69/08* (2013.01); *B01D 2256/245* (2013.01); *B01D 2257/504* (2013.01); *B01D 2325/02* (2013.01); *B01D 2325/021* (2013.01); *B01D 2325/04* (2013.01); *C04B 2111/00801* (2013.01)

(58) Field of Classification Search
CPC ........... B01D 2325/02; B01D 2325/04; B01D 53/228; B01D 67/006; B01D 69/04; B01D 71/025; B01D 71/028; B01D 67/0006; B01D 69/08; B01D 67/0041; B01D 2325/021; C04B 38/00; C04B 41/009; C04B 41/52; C04B 41/85; C04B 41/89; C04B 2111/00801; C04B 38/0006; Y02C 20/40
See application file for complete search history.

(56) References Cited

U.S. PATENT DOCUMENTS

| | | | | |
|---|---|---|---|---|
| 2007/0131609 A1* | 6/2007 | Ramaswamy | ...... | C01B 13/0255 210/490 |
| 2008/0105613 A1* | 5/2008 | Ichikawa | ............ | C04B 38/0032 210/510.1 |
| 2008/0290021 A1* | 11/2008 | Buijs | ...................... | B01D 69/12 210/500.27 |
| 2010/0072127 A1* | 3/2010 | Ichikawa | ............. | B01D 63/066 210/496 |
| 2010/0236410 A1* | 9/2010 | Farzana | ................. | B01D 71/36 95/279 |
| 2014/0199478 A1 | 7/2014 | Ichikawa et al. | | |
| 2015/0008180 A1 | 1/2015 | Uchikawa et al. | | |
| 2015/0209721 A1* | 7/2015 | Hinklin | ................... | B01D 69/12 96/11 |
| 2015/0217238 A1* | 8/2015 | Tang | ...................... | B01D 71/56 210/483 |
| 2016/0129401 A1* | 5/2016 | Furuno | .................... | B32B 5/18 210/483 |
| 2016/0375405 A1* | 12/2016 | Miyahara | ............ | B01D 63/066 210/500.21 |
| 2017/0239624 A1* | 8/2017 | Zahir | ..................... | B01D 71/56 |
| 2020/0406202 A1* | 12/2020 | Miyahara | ................. | B01J 20/28 |

FOREIGN PATENT DOCUMENTS

| | | |
|---|---|---|
| JP | 2010-188262 A1 | 9/2010 |
| WO | 2013/042262 A1 | 3/2013 |
| WO | 2013/146956 A1 | 10/2013 |
| WO | 2015/146354 A1 | 10/2015 |

OTHER PUBLICATIONS

English translation of International Preliminary Report on Patentability (Chapter I) (Application No. PCT/JP2017/009234) dated Oct. 11, 2018.
International Search Report and Written Opinion (Application No. PCT/JP2017/009234) dated May 23, 2017.

* cited by examiner

POROUS SUPPORT, METHOD FOR MANUFACTURING POROUS SUPPORT, SEPARATION MEMBRANE STRUCTURE, AND METHOD FOR MANUFACTURING SEPARATION MEMBRANE STRUCTURE

BACKGROUND OF THE INVENTION

1. Field of the Invention

The present invention relates to a porous support, a method of manufacturing the porous support, a separation membrane structure, and a method of manufacturing the separation membrane structure.

2. Description of Related Art

A separation membrane structure is known to typically comprise a porous support that is configured by a base body, an intermediate layer formed on the base body, and a surface layer formed on the intermediate layer, and a separation membrane that is formed on the surface layer (reference is made to PCT Laid Open Application 2013/146956).

The membrane formation characteristics of the separation membrane and the strength of the porous support can be enhanced by a configuration in which the average pore diameter of the intermediate layer is smaller than the average pore diameter of the base body and the average pore diameter of the surface layer is smaller than the average pore diameter of the intermediate layer.

SUMMARY OF THE INVENTION

However, when the average pore diameter of the surface layer is reduced, there is a tendency for the porosity of the surface layer to be reduced and therefore there will be a reduction in the number of passages that enable flow of a component, that has permeated through the separation membrane, from the separation membrane to the surface layer. As a result, there is the problem that the effective surface area of the separation membrane will be reduced and the permeation amount for the separation membrane will decrease.

The present invention is proposed to solve the problem described above, and has the purpose of providing a porous support, a method of manufacturing the porous support, a separation membrane structure, and to a method of manufacturing the separation membrane structure that enable enhancement of the permeation amount of the separation membrane while maintaining strength.

Solution to Problem

The porous support of the present invention includes a base body, a supporting layer and a topmost layer. The supporting layer is disposed between the base body and the topmost layer, and makes contact with the topmost layer. The ratio of the porosity of the topmost layer to the porosity of the supporting layer is greater than or equal to 1.08, and the ratio of the thickness of the topmost layer to the thickness of the supporting layer is less than or equal to 0.9.

The present invention enables the provision of a porous support, a method of manufacturing the porous support, a separation membrane structure, and a method of manufacturing the separation membrane structure that enable enhancement of the permeation amount of the separation membrane.

DETAILED DESCRIPTION OF THE INVENTION

Figure 1:
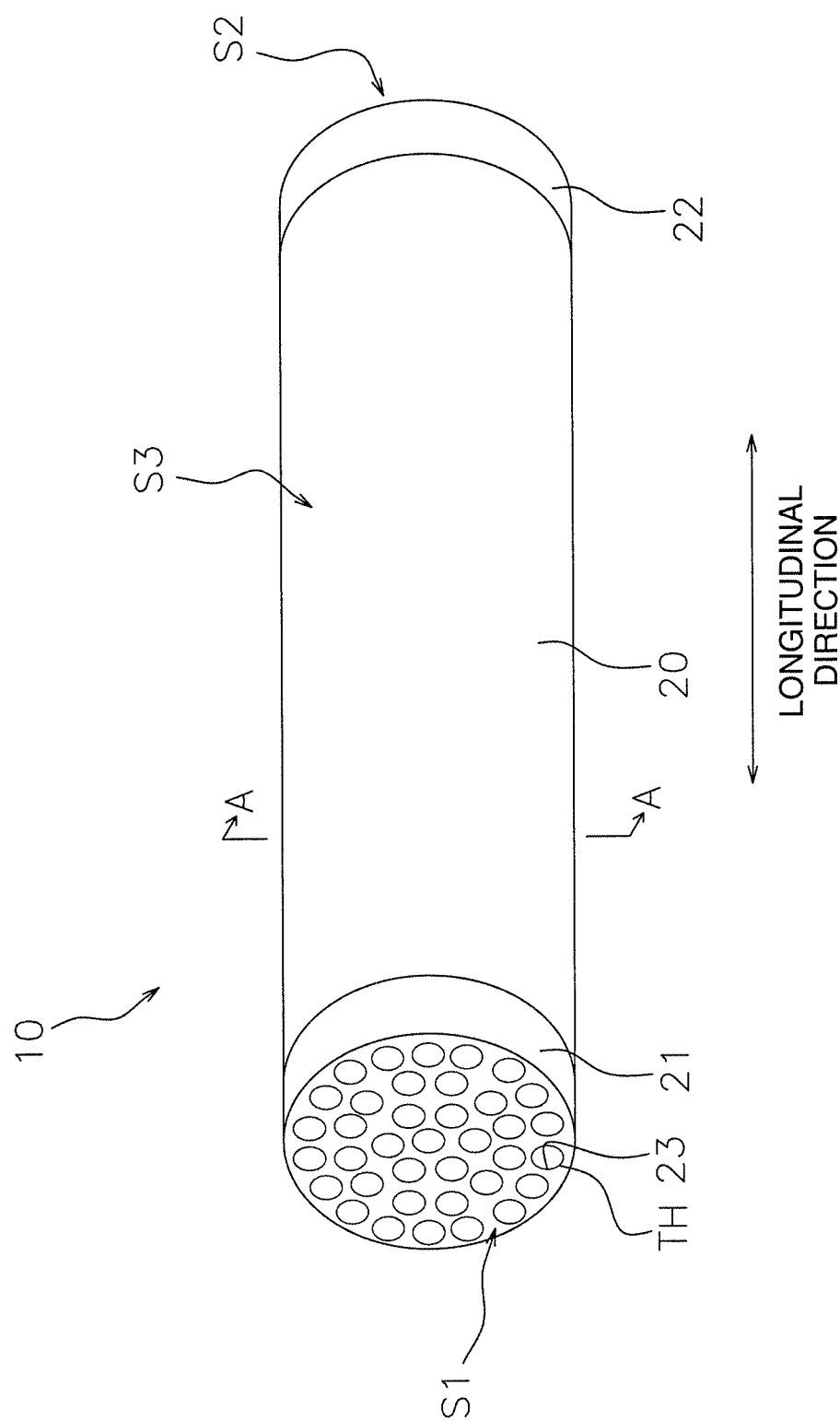
FIG. 1 is a perspective view illustrating a separation membrane structure.

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

In the following embodiments, the term "monolithic" is a concept that denotes a shape that includes a plurality of through-holes formed in a longitudinal direction, and includes a honeycomb shape.

Structure of Separation Membrane Structure 10

Figure 2:
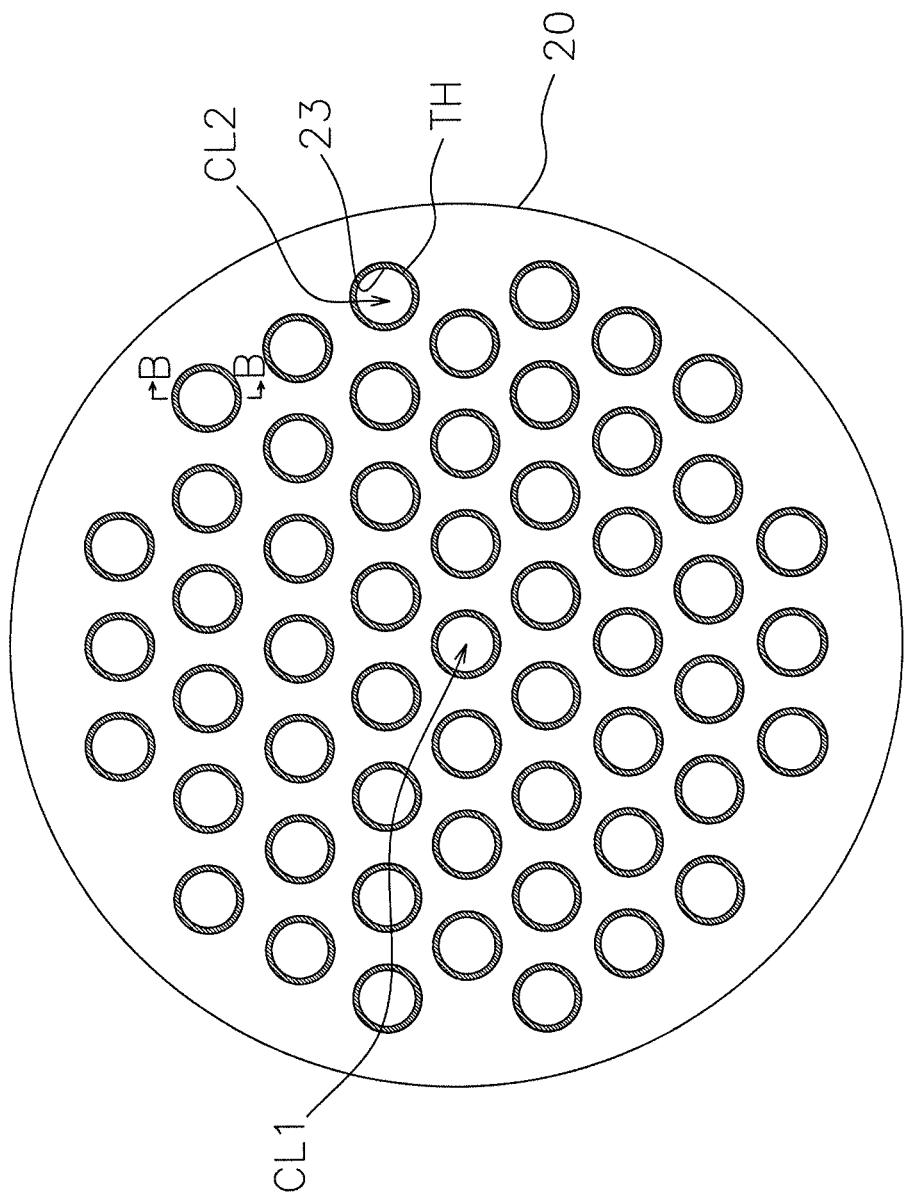
FIG. 2 illustrates a sectional view along A-A in FIG. 1.

FIG. 1 is a perspective view illustrating a separation membrane structure 10. FIG. 2 illustrates a sectional view along A-A in FIG. 1.

The separation membrane structure 10 includes a porous support 20, a first seal portion 21, a second seal portion 22 and a separation membrane 23.

The porous support 20 is configured by a monolithic porous material. Although there is no particular limitation in relation to the length of the porous support 20, it may for example be configured as 150 to 2000 mm. Although there is no particular limitation in relation to the diameter of the porous support 20, it may for example be configured as 30 to 220 mm. However the outer shape of the porous support 20 is not limited to a monolithic configuration and may take a flat plate shape, a tubular shape, a cylindrical shape, a columnar shape, or a prismatic shape.

The porous support 20 has a first end surface S1, a second end surface S2, and a side surface S3. The first end surface S1 is provided opposite to the second end surface S2. The side surface S3 is connected to an outer edge of the first end surface S1 and the second end surface S2. The porous support 20 includes a plurality of through-holes TH that are connected with the first end surface S1 and the second end surface S2. The plurality of through-holes TH extends in a longitudinal direction of the porous support 20.

The first seal portion 21 covers the whole surface of the first end surface S1 and a portion of the side surface S3. The first seal portion 21 inhibits infiltration of a mixed fluid that is the object of a filtration process (mixed liquid or mixed gas) into the first end surface S1 of the porous support 20. The material that configures the first seal portion 21 includes use of glass, metal, or the like. However, glass is preferred in light of adaptability with the thermal expansion coefficient of the porous support 20.

The second seal portion 22 covers the whole surface of the second end surface S2 and a portion of the side surface S3. The second seal portion 22 inhibits infiltration of a mixed fluid that is the object of a filtration process onto the second end surface S2 of the porous support 20. The material that configures the second seal portion 22 includes use of glass, metal, or the like. However, glass is preferred in light of adaptability with the thermal expansion coefficient of the porous support 20.

The separation membrane 23 is formed on an inner surface of the plurality of respective through-holes TH that is formed on the porous support 20. The separation membrane 23 is formed as a cylindrical tube. Cells CL are formed on an inner side of the separation membrane 23 to enable flow of a mixed fluid that is the object of a filtration process. As shown in FIG. 2, the separation membrane structure 10 includes a plurality of cells CL that includes a central cell CL1 and a plurality of outermost cells CL2. The cross sectional shape of the cells CL is not limited to circular and may be triangular or polygonal.

The material used to configure the separation membrane 23 may include use of an inorganic material, metal or the like. The inorganic material for the separation membrane 23 includes zeolite, carbon, silica, or the like. Although there is no particular limitation in relation to the crystalline structure of the zeolite that configures the separation membrane 23, for example, it is possible to use LTA, MFI, MOR, FER, FAU, DDR, CHA, BEA, or the like. When the separation membrane 23 is configured as a DDR type zeolite membrane, suitable use is enabled as a gas separation membrane for selective removal of carbon dioxide. The metal material that is used in relation to the separation membrane 23 includes use of palladium, or the like.

The thickness of the separation membrane 23 in a radial direction about the axial center of the cells CL may be arbitrarily set in response to the type of material that configures the separation membrane 23. When the permeation amount in a mixed fluid of a permeation component, that can permeate the separation membrane 23 is considered, a value of less than or equal to 10 μm is preferred, and less than or equal to m is more preferred.

Configuration of Porous Support 20

Figure 3:
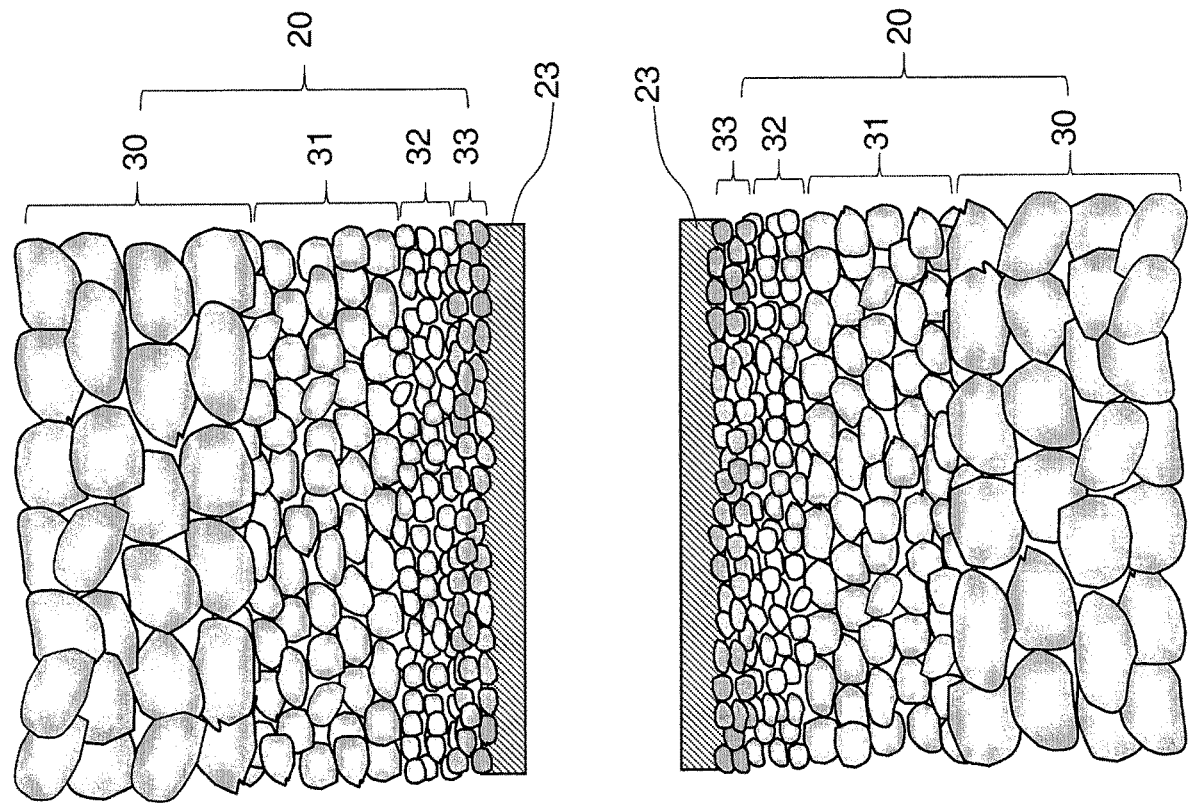
FIG. 3 illustrates a sectional view along B-B in FIG. 2.

FIG. 3 illustrates a sectional view along B-B in FIG. 2. The porous support 20 includes a base body 30, an intermediate layer 31, a supporting layer 32 and a topmost layer 33.

1. Base Body 30

The base body 30 is formed from a porous material. The porous material that forms the base body 30 includes use of a ceramic, metal, resin, or the like. In particular, use of a porous ceramic is preferred. The aggregate particles used in relation to the porous ceramic material include alumina ($Al_2O_3$), titania ($TiO_2$), mullite ($Al_2O_3.SiO_2$), potsherd, and cordierite ($Mg_2Al_4Si_5O_{18}$), and in particular, alumina is preferred in light of ease of availability, clay stability, and anticorrosive properties.

The base body 30 may include an inorganic binder in addition to the porous material. The inorganic binder is a binding material for binding to the aggregate particles and is an inorganic component that undergoes sintering solidification at a temperature at which the aggregate particles do not undergo sintering. The inorganic binder may include at least one of titania, magnesia, calcia, mullite, sinterable alumina, silica, glass frits, clay minerals, and sinterable cordierite. Sinterable alumina can be used when the aggregate particles are alumina and has an average particle diameter that is less than or equal to 1/10 of the average particle diameter of the aggregate particles. Sinterable cordierite can be used when the aggregate particles are cordierite and is cordierite that has an average particle diameter that is less than or equal to 1/10 of the average particle diameter of the aggregate particles.

Although there is no particular limitation in relation to the porosity of the base body 30, it may be configured to 25% to 50%. When taking into account the strength (for example, the internal pressure fracture strength) of the porous support 20, the porosity of the base body 30 is preferably less than or equal to 45%. The porosity of the base body 30 may be measured using an Archimedes Method.

Although there is no particular limitation in relation to the average pore diameter of the base body 30, it may be configured as 5 μm to 25 μm. When taking into account the permeation rate in the base body 30 of a permeation component that has permeated the separation membrane 23, the average pore diameter of the base body 30 is preferably greater than or equal to 10 μm. The average pore diameter of the base body 30 may be measured using a mercury porosimeter.

Although there is no particular limitation in relation to the average particle diameter of the particles that configure the base body 30, it may take a value of 5 μm to 200 μm. When the permeation resistance of the base body 30 is taken into account, the average particle diameter the particles that configure the base body 30 is preferably 75 μm to 150 μm. The average particle diameter the particles that configure the base body 30 is obtained as the value of the arithmetic mean for the maximum diameter of 30 measured particles that are measured by cross sectional micro-structure observation by use of a scanning electron microscope (SEM).

Although there is no particular limitation on the thickness (referred to below as "partition wall thickness") of the base body 30 between two cells CL, it may be configured as 0.5 mm to 2.0 mm. The strength (for example, the internal pressure fracture strength) of the porous support 20 can be enhanced by a large partition wall thickness. The permeation amount of a permeation component can be increased by reducing the partition wall thickness to thereby increase the number of cells CL formed on the porous support 20.

2. Intermediate Layer 31

The intermediate layer 31 is disposed on the inner surface of the base body 30. The intermediate layer 31 is formed as a cylindrical tube. The intermediate layer 31 can be configured by a porous ceramic material. The porous ceramic material used to configure the intermediate layer 31 includes the configuration used in the base body 30. The intermediate layer 31 may contain the inorganic binder in addition to the porous material. The inorganic binder may be the same type that is used in the base body 30 as described above.

Although there is no particular limitation in relation to the porosity of the intermediate layer 31, it may be configured as 5% to 60%. When taking into account the strength of the porous support 20, the porosity of the intermediate layer 31 is preferably less than or equal to 30%. When taking into account the permeation rate in the intermediate layer 31 of a permeation component that has permeated the separation membrane 23, the porosity of the intermediate layer 31 is preferably greater than or equal to 31%. The porosity of the intermediate layer 31 can be measured by a calculation that uses a binarized image obtained by FE-SEM observation.

Although there is no particular limitation on the thickness of the intermediate layer 31, it may be configured as 50 mm to 500 mm. The strength of the porous support 20 can be enhanced by increasing the thickness of the intermediate layer 31. The permeation amount of a permeation component can be increased by reducing the thickness of the intermediate layer 31 to thereby increase the surface area of the separation membrane 23 in the cells CL.

Although there is no particular limitation in relation to the average pore diameter of the intermediate layer 31, it should be smaller than the average pore diameter of the base body 30 and may be configured for example as 0.05 μm to 5 μm. When taking into account the permeation rate in the intermediate layer 31 of a permeation component that has permeated the separation membrane 23, the average pore diameter of the intermediate layer 31 is preferably greater than or equal to 0.1 μm. The average pore diameter of the intermediate layer 31 may be measured using an air flow method as described in ASTM F316.

Although there is no particular limitation in relation to the average particle diameter of the particles that configure the intermediate layer 31, it may take a value of 1 μm to 100 μm. When permeation resistance and strength are taken into account, the average particle diameter the particles that configure the intermediate layer 31 is preferably 20 μm to 50 μm. The average particle diameter the particles that configure the intermediate layer 31 is obtained as the value of the arithmetic mean for the maximum diameter of 30 measured particles that are measured by cross sectional micro-structure observation by use of SEM.

3. Supporting Layer 32

The supporting layer 32 is disposed on the inner surface of the intermediate layer 31. The supporting layer 32 is formed as a cylindrical tube. The supporting layer 32 supports the topmost layer 33 described below. The supporting layer 32 is configured by a porous ceramic material. The porous ceramic material includes the configuration used in the base body 30 as described above. The supporting layer 32 may contain the inorganic binder in addition to the porous material. The inorganic binder includes the configuration used in the base body 30 as described above.

When taking into account a feature of maintaining strength, the porosity of the supporting layer 32 should be lower than the porosity of the topmost layer 33, and for example may be configured as 5% to 50%. When taking into account the strength of the supporting layer 32 itself that supports the topmost layer 33, the porosity of the supporting layer 32 is preferably less than or equal to 42%, more preferably less than or equal to 35%, and still more preferably less than or equal to 27%. When taking into account the permeation rate in the supporting layer 32 of a permeation component that has permeated the separation membrane 23, the porosity of the supporting layer 32 is preferably greater than or equal to 12%, more preferably less than or equal to 27%, and still more preferably less than or equal to 35%. The porosity of the supporting layer 32 can be measured by a calculation by use of a binarized image obtained by FE-SEM observation.

Although there is no particular limitation on the thickness of the supporting layer 32, it may be configured as 1 μm to 300 μm, and is preferably 10 μm to 250 μm. The strength of the porous support 20 can be enhanced by increasing the thickness of the supporting layer 32. The permeation amount of a permeation component can be increased by reducing the thickness of the supporting layer 32 to thereby increase the surface area of the separation membrane 23 in the cells CL.

Although there is no particular limitation in relation to the average pore diameter of the supporting layer 32, it should be smaller than the average pore diameter of the intermediate layer 31 and may be configured as 0.001 μm to 1 μm. When taking into account the permeation rate in the supporting layer 32 of a permeation component that has permeated the separation membrane 23, the average pore diameter of the supporting layer 32 is preferably greater than or equal to 0.05 μm. The average pore diameter of the supporting layer 32 may be measured using an air flow method as described in ASTM F316.

Although there is no particular limitation in relation to the average particle diameter of the particles that configure the supporting layer 32, it may take a value of 0.01 μm to 1 μm. When permeation resistance and strength are taken into account, the average particle diameter the particles that configure the supporting layer 32 is preferably 0.05 μm to 0.8 μm. The average particle diameter the particles that configure the supporting layer 32 is obtained as the value of the arithmetic mean for the maximum diameter of 30 measured particles that are measured by cross sectional micro-structure observation by use of SEM.

4. Topmost Layer 33

The topmost layer 33 is disposed on the inner surface of the supporting layer 32. The topmost layer 33 is formed as a cylindrical tube. The topmost layer 33 is configured by a porous ceramic material. The porous ceramic material includes the configuration used in the base body 30 as described above. The topmost layer 33 may contain the inorganic binder in addition to the porous material. The inorganic binder includes the configuration used in the base body 30 as described above.

The porosity of the topmost layer 33 is higher than the porosity of the supporting layer 32. More specifically, the ratio of the porosity of the topmost layer 33 to the porosity of the supporting layer 32 is greater than or equal to 1.08. In this manner, since it is possible to maintain a sufficient number of passages enabling flow to the topmost layer 33 of a permeation component that has permeated the separation membrane 23, the effective surface of the separation membrane 23 can be increased and thereby enhances the permeation amount of the separation membrane 23. The ratio of the porosity of the topmost layer 33 to the porosity of the supporting layer 32 is preferably greater than or equal to 1.14, and still more preferably greater than or equal to 1.40.

As long as the ratio of the porosity of the topmost layer 33 to the porosity of the supporting layer 32 is greater than or equal to 1.08, there is no particular limitation on the porosity of the topmost layer 33, and for example, it may be configured as 10% to 60%. When taking into account enhancing the permeation amount of the separation membrane 23, the porosity of the topmost layer 33 is preferably greater than or equal to 38%, more preferably greater than or equal to 42%, and still more preferably greater than or equal to 48%. Furthermore, when taking into account a feature of the strength of the topmost layer 33, the porosity of the topmost layer 33 is preferably less than or equal to 60%, more preferably less than or equal to 50%, and still more preferably less than or equal to 48%. The porosity of the topmost layer 33 can be measured by a calculation with reference to a binarized image obtained by FE-SEM observation.

The thickness of the topmost layer 33 is less than the thickness of the supporting layer 32. More specifically, the ratio of the thickness of the topmost layer 33 to the thickness of the supporting layer 32 is less than or equal to 0.9. In this manner, since it is possible to maintain the strength of the topmost layer 33 itself as well as maintaining the strength of the supporting layer 32 that supports the topmost layer 33, there is a resulting improvement in the strength of the porous support 20. The ratio of the thickness of the topmost layer 33 to the thickness of the supporting layer 32 is preferably less than or equal to 0.1, more preferably less than or equal to 0.05, and still more preferably less than or equal to 0.025.

As long as the ratio of the thickness of the topmost layer 33 to the thickness of the supporting layer 32 is less than or equal to 0.9, there is no particular limitation on the thickness of the topmost layer 33, and for example, it may be configured as 0.1 to 30 µm. When the strength of the topmost layer 33 itself is considered, the thickness of the topmost layer 33 is preferably greater than or equal to 0.1 µm, more preferably greater than or equal to 0.5 µm, and still more preferably greater than or equal to 1.0 µm.

Although there is no particular limitation in relation to the average pore diameter of the topmost layer 33, it should be greater than the average pore diameter of the supporting layer 32 and may be configured for example as 0.001 µm to 1 µm. When taking into account the impregnation of the separation membrane 23 into the topmost layer 33 (that is to say, a compound layer 33a as described below) or the membrane formation characteristics of the separation membrane 23, the average pore diameter of the topmost layer 33 is preferably less than or equal to 0.5 µm. The average pore diameter of the topmost layer 33 may be measured using an air flow method as described in ASTM F316.

Although there is no particular limitation in relation to the average particle diameter of the particles that configure the topmost layer 33, it may take a value of 0.02 µm to 1 µm. When permeation resistance and strength are taken into account, the average particle diameter the particles that configure the topmost layer 33 is preferably less than or equal to 0.7 µm. The average particle diameter the particles that configure the topmost layer 33 is obtained as the value of the arithmetic mean for the maximum diameter of 30 µmeasured particles that are measured by cross sectional micro-structure observation by use of SEM.

Figure 4:
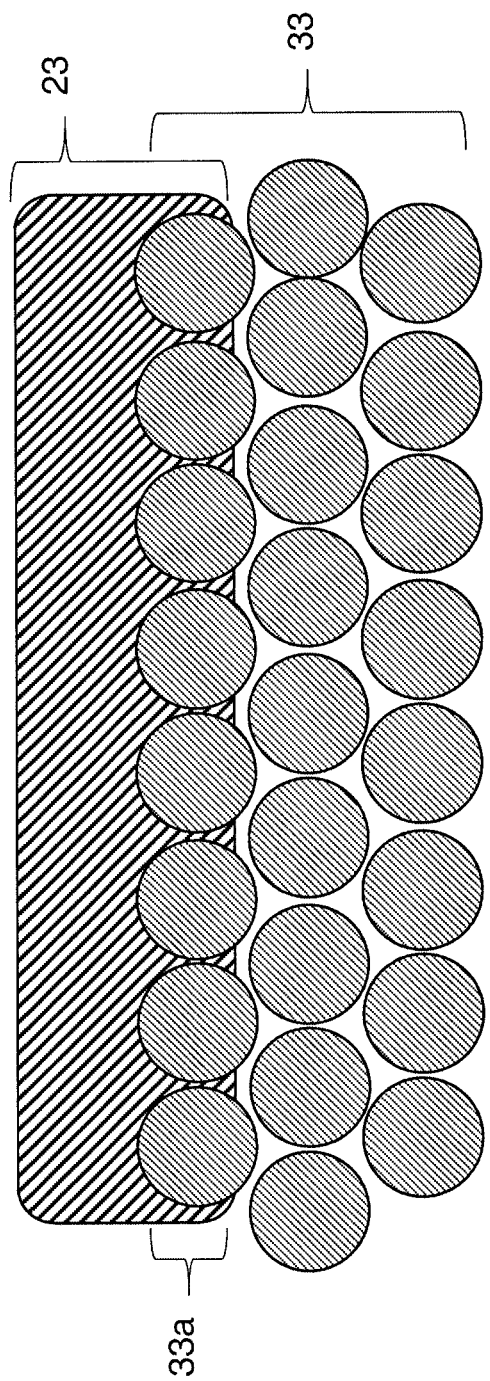
FIG. 4 illustrates a partial enlargement of FIG. 3.

FIG. 4 illustrates a partial enlargement of FIG. 3. FIG. 4 is a schematic illustration of the bonding region of the topmost layer 33 and the separation membrane 23. The topmost layer 33 includes a compound layer 33a. The compound layer 33a is the portion of contact with the separation membrane 23 of the topmost layer 33. A configuration in which the separation membrane 23 penetrates the topmost layer 33 forms the compound layer 33a as a mixed layer of the particles that configure the topmost layer 33 and the substance that configures the separation membrane 23. Although there is no particular limitation on the thickness of the compound layer 33a, it may be configured as 0.01 µm to 1 µm. When taking into account the bonding strength between the separation membrane 23 and the topmost layer 33, the thickness of the compound layer 33a is preferably greater than or equal to 0.01 µm, more preferably greater than or equal to 0.1 µm, and still more preferably greater than or equal to 0.2 µm. When taking into account the permeation amount, the thickness of the topmost layer 33 is preferably less than or equal to 1 µm, more preferably less than or equal to 0.2 µm, and still more preferably less than or equal to 0.1 µm.

Furthermore, as shown in FIG. 2, due to the fact that the porous support 20 has a central cell CL1 and an outermost cell CL2, it is preferred that there is a small "thickness difference" between the topmost layer 33 that is provided in the central cell CL1 and the topmost layer 33 that is provided in the outermost cell CL2. More specifically, when preparing a green body for the topmost layer 33 by use of a flow-down method, although there is a tendency for a first thickness of the topmost layer 33 that is provided in the central cell CL1 to be greater than a second thickness in the topmost layer 33 that is provided in the outermost cell CL2, the first thickness is preferably less than or equal to 1.2 times the second thickness and more preferably less than or equal to 1.1 times.

Method of Manufacturing Separation Membrane Structure 10

Next a method of manufacturing the separation membrane structure 10 will be described.

Firstly, a green body for the monolithic base body 30 is formed by extrusion molding, a press molding or a slip casting the starting material for the base body 30. Next, the green body for the base body 30 is fired (for example, 900 degrees C. to 1600 degrees C., 1 hour to 100 hours) to thereby form the base body 30.

Next, a first intermediate layer slurry is prepared by mixing a sintering additive (for example, silica or magnesia or the like), an organic binder, a pH adjusting agent and a surface active agent, or the like into the inorganic binding material and the aggregate for the intermediate layer 31.

Then, a green body for the intermediate layer 31 is formed by a down-flow method, a filtration method or a dipping method that uses the first intermediate layer slurry. Then the green body for the intermediate layer 31 is fired (for example, 900 degrees C. to 1600 degrees C., 1 hour to 100 hours) to thereby form the intermediate layer 31.

Next, a supporting layer slurry is prepared by mixing a sintering additive, an organic binder, a pH adjusting agent and a surface active agent, or the like into the inorganic binding material and the aggregate for the supporting layer 32.

Then, a green body for the supporting layer 32 is formed by a down-flow method, a filtration method or a dipping method that uses the supporting layer slurry. Then the green body for the supporting layer 32 is fired (for example, 1100 degrees C. to 1400 degrees C., 1 hour to 100 hours) to thereby form the supporting layer 32. At that time, the porosity of the supporting layer 32 can be controlled by adjusting the firing temperature and/or the firing time.

Next, a topmost layer slurry is prepared by mixing a sintering additive, an organic binder, a pH adjusting agent and a surface active agent, or the like into the inorganic binding material and the aggregate for the topmost layer 33. At that time, the particle diameter of the aggregate for the topmost layer slurry, and the addition amount of the sintering additive and surface active agent can be adjusted to thereby adjust the average pore diameter of the topmost layer 33.

A green body for the topmost layer 33 is formed by a down-flow method, a filtration method or a dipping method that uses the topmost layer slurry. At that time, the concentration of the topmost layer slurry may be adjusted to thereby adjust the thickness of the topmost layer 33. Then the green body for the topmost layer 33 is fired (for example, 1100 degrees C. to 1400 degrees C., 1 hour to 100 hours) to thereby form the topmost layer 33. At that time, the porosity of the topmost layer 33 can be controlled by adjusting the firing temperature and/or the firing time.

More specifically, when the firing temperature of the topmost layer 33 is lower than the firing temperature for the supporting layer 32, the porosity of the topmost layer 33 can be configured to be greater than the porosity of the supporting layer 32. Furthermore, when the firing time of the topmost layer 33 is shorter than the firing time for the supporting layer 32, the porosity of the topmost layer 33 can be configured to be greater than the porosity of the supporting layer 32. In addition, when the firing temperature of the topmost layer 33 is lower than the firing temperature for the supporting layer 32, and the firing time is shorter, the porosity of the topmost layer 33 can be configured to be greater than the porosity of the supporting layer 32.

However, when a pore forming agent is added to the topmost layer slurry, the porosity of the topmost layer 33 can be controlled in response to the addition amount of the pore forming agent without reference to the firing temperature or the firing time.

Next, the separation membrane 23 is formed on a surface of the topmost layer 33. The method of preparing the separation membrane 23 includes suitable application of a known method depending on the membrane type.

For example, known configurations include a carbon monoxide separation membrane (for example, reference is made to Japanese Patent No. 4006107), a helium separation membrane (for example, reference is made to Japanese Patent No. 3953833), a hydrogen separation membrane (for example, reference is made to Japanese Patent No. 3933907), a carbon membrane (for example, reference is made to Japanese Patent Application Laid-Open No. 2003-286018), a zeolite membrane (for example, reference is made to Japanese Patent Application Laid-Open No. 2004-66188), and a silica membrane (for example, reference is made to the pamphlet of PCT Laid Open Application 2008/050812).

Although the compound layer 33a of the topmost layer 33a is formed at the same time as the formation of the separation membrane 23, when the seed crystals are caused to undergo secondary growth as in a zeolite membrane, the thickness of the compound layer 33a can be adjusted with reference to the particle diameter of the seed crystals, the synthesis temperature, the synthesis time, the average pore diameter of the topmost layer 33, or a combination thereof. Furthermore, when a direct membrane such as a silica membrane or carbon membrane is formed, the thickness of the compound layer 33a can be adjusted with reference to the particle diameter of the membrane starting material, the solid component, the viscosity, the average pore diameter of the topmost layer 33, or a combination thereof.

The seal slurry can be adjusted by mixing an organic binder and water into the starting material for the first seal portion 21 and the second seal portion 22. Next, a green body for the first seal portion 21 and the second seal portion 22 is formed by coating the seal slurry onto the first end surface S1 and second end surface S2 of the porous support 20. The green body for the first seal portion 21 and the second seal portion 22 is fired (800 to 1000 degrees C., 1 to 100 hours) to thereby form the first seal portion 21 and the second seal portion 22.

Other Embodiments

Although an embodiment of the present invention has been described, the present invention is not limited to the above embodiment, and various modifications are possible within a scope that does not depart from the spirit of the invention.

In the above embodiment, although the porous support 20 is configured to include only one intermediate layer 31, a plurality of intermediate layers 31 may be provided. In such a configuration, the porosity, average pore diameter, average particle diameter and thickness may be different in each of the plurality of intermediate layers 31. The porosity, average pore diameter, average particle diameter and thickness in the plurality of intermediate layers 31 may be set to reduce as the supporting layer 32 is approached.

In the present embodiment, the separation membrane structure 10 was configured to include the intermediate layer 31. However the intermediate layer 31 may be omitted.

In the present embodiment, the separation membrane structure 10 included a support layer 32. However the support layer 32 may be omitted. In such a configuration, the intermediate layer 31 may function as a support layer for the topmost layer 33.

EXAMPLES

The examples of the present invention will be described below. However, the present invention is not thereby limited to the following examples.
Preparation of Samples No. 1 to No. 35

Firstly, 20 parts by mass of glass powder (an inorganic binder) was added to 100 parts by mass of alumina powder (aggregate) having an average particle diameter of 100 μm, and then water, a dispersing agent and a thickener were added, and the mixture was kneaded to prepare a clay. Then a green body for the monolithic base body was prepared by extrusion molding of the prepared clay. Next, the green body for the base body was fired (1250 degrees C., 2 hours, temperature increase and temperature decrease rate 1000 degrees C./hour). The average particle diameter of the base body was 20 μm.

Then 14 parts by mass of titania powder was added to 100 parts by mass of alumina powder having an average particle diameter of 50 μm, and then water, a dispersing agent and a thickener were added and mixed to prepare an intermediate layer slurry. Then a green body for the intermediate layer was prepared by deposition of the intermediate layer slurry onto an inner peripheral surface of the through holes in the base body 30 by a flow-down method. Next, firing was performed (1250 degrees C., 1 hour, temperature increase and temperature decrease rate 1000 degrees C./hour) in an electric furnace in an atmosphere of air.

Then, a supporting layer slurry was prepared by adding and mixing a supporting layer material powder (average particle diameter 0.2 μm) as shown in Table 1, water, a dispersing agent and a thickener. Next, a green body for the supporting layer was formed by deposition of the supporting layer slurry onto an inner peripheral surface of the intermediate layer by a filtration method. Next, firing was performed in an electric furnace in an atmosphere of air.

More specifically, Sample Nos. 1 to 3, 12 to 30, and 33 had firing conditions of 1250 degrees C., 100 hours and a temperature increase and temperature decrease rate of 100 degrees C./hour. Sample Nos. 4 to 6 had firing conditions of 1250 degrees C., 200 hours and a temperature increase and temperature decrease rate of 100 degrees C./hour. Sample No. 7 had firing conditions of 1250 degrees C., 110 hours and a temperature increase and temperature decrease rate of 100 degrees C./hour. Sample Nos. 8 to 10 had firing conditions of 1250 degrees C., 10 hours and a temperature increase and temperature decrease rate of 100 degrees C./hour. Sample Nos. 11, 31, 34 and 35 had firing conditions of 1200 degrees C., 1 hour and a temperature increase and temperature decrease rate of 100 degrees C./hour. Sample No. 32 had firing conditions of 1150 degrees C., 1 hour and a temperature increase and temperature decrease rate of 100 degrees C./hour.

Then, a topmost layer slurry was prepared by adding and mixing a topmost layer material powder as shown in Table 1, water, a dispersing agent and a thickener. In Sample No. 22, the average particle diameter of the topmost layer material powder was 0.05 μm, in Sample No. 28, the average particle diameter of the topmost layer material powder was 0.5 μm, and in other samples, the average particle diameter of the topmost layer material powder was 0.2 μm. Furthermore, in Sample Nos. 31, 32, 34 and 35, a topmost layer slurry was prepared by adding a sintering additive (colloidal silica) to a topmost layer material powder, water, a dispersing agent and a thickener.

Then a green body for the topmost layer was prepared by deposition of the topmost layer slurry onto an inner peripheral surface of the supporting layer by a flow-down method. Next, firing was performed in an electric furnace in an atmosphere of air.

More specifically, Sample Nos. 1, 4, 8, 12 to 21, 23 to 24, 29 to 30, and 33 had firing conditions of 1250 degrees C., 1 hour and a temperature increase and temperature decrease rate of 50 degrees C./hour. Sample Nos. 2, 5 and 9 had firing conditions of 1200 degrees C., 1 hour and a temperature increase and temperature decrease rate of 100 degrees C./hour. Sample Nos. 3, 6, 10 to 11 and 25 had firing conditions of 1150 degrees C., 1 hour and a temperature increase and temperature decrease rate of 100 degrees C./hour. Sample No. 7 had firing conditions of 1250 degrees C., 90 hours and a temperature increase and temperature decrease rate of 100 degrees C./hour. Sample No. 22 had firing conditions of 950 degrees C., 6 hours and a temperature increase and temperature decrease rate of 100 degrees C./hour. Sample No. 26 had firing conditions of 950 degrees C., 1 hour and a temperature increase and temperature decrease rate of 100 degrees C./hour. Sample No. 27 had firing conditions of 1250 degrees C., 1 hour and a temperature increase and temperature decrease rate of 100 degrees C./hour. Sample No. 28 had firing conditions of 1250 degrees C., 1 hour and a temperature increase and temperature decrease rate of 100 degrees C./hour. Sample Nos. 31, 34 and 35 had firing conditions of 1250 degrees C., 10 hours and a temperature increase and temperature decrease rate of 100 degrees C./hour. Sample No. 32 had firing conditions of 1250 degrees C., 1 hour and a temperature increase and temperature decrease rate of 100 degrees C./hour.

Next, a separation membrane as shown in Table 1 was formed on an inner surface of the topmost layer. In Sample Nos. 1 to 28, 31 to 33, a DDR-type zeolite membrane was formed as the separation membrane, in Sample Nos. 29 and 34, a silica membrane was formed as the separation membrane, and in Sample Nos. 30 and 35, a carbon membrane was formed as the separation membrane. The respective preparation methods are described below.

(1) Preparation of DDR-Type Zeolite Membrane

Firstly a DDR-type zeolite crystal powder was manufactured and used as a seed crystal based on the disclosure of M. J. den Exter, J. C. Jansen, H. van Bekkum, Studies in Surface Science and Catalysis, Vol. 84, Ed. By J. Weitkamp et al., Elsevier (1994), 1159-1166, or the disclosure of Japanese Patent Application Laid-Open No. 2004-083375. After dispersing the seed crystals in water, a seed crystal dispersion was prepared by removal of coarse crystals.

Next, the DDR concentration was adjusted to 0.001 to 0.36 mass % by diluting the seed crystal dispersion with ethanol. Next a seeded slurry solution was caused to flow into the cells and thereby deposit seed crystals on a surface of the topmost layer.

Then, 1.156 g of 1-adamantane amine (manufactured by Aldrich) was added to 7.35 g of ethylene diamine (manufactured by Wako Pure Chemical Industries, Ltd.) and dissolved. Then 98.0 g of 30 mass % colloidal silica (Trade name: Snowtex S, manufactured by Nissan Chemical Industries, Ltd.) and 516.55 g of ion exchanged water were added, and then this mixture was added to the 1-adamantane amine and ethylene diamine mixture to make a starting material solution. The porous support 20 was placed into the starting material solution, and thermal processing (hydrothermal synthesis) was performed at 125 degrees C. for 30 hours to thereby form a DDR-type zeolite membrane.

Next, the DDR-type zeolite membrane was heated (air, 450 degrees C., 50 hours) in an electric furnace to thereby combust and remove the 1-adamantane amine.

(2) Preparation of Silica Membrane

Firstly, a coating solution having a 1% solid component was prepared by dispersing a silica sol solution which is was prepared by hydrolyzing tetraethoxysilane in ethanol. The coating solution was coated and dried onto the surface of the topmost layer and fired in air for 1 hour at 400 degrees C. The coating and firing of the coating solution as described above was repeated three times to thereby form a silica membrane.

(3) Preparation of Carbon Membrane

Firstly, a precursor solution was prepared by dissolving a phenol resin in an organic solvent. Next, a dip coating method was used to form the precursor solution as a membrane on an inner surface of the surface layer. Then, thermal processing (for example, 300 degrees C., 1 hour) was performed on the surface of the precursor solution that is formed as a membrane to thereby dispose a polyimide resin as a precursor. Thereafter, the polyimide resin was thermally processed (non-oxygen atmosphere, 600 degrees C., 5 hours) to thereby form a carbon membrane.

Porosity Measurement of Supporting Layer and Topmost Layer

As described below, the porosity in the supporting layer and the topmost layer of each sample was measured.

Firstly, a cross section of a sample was embedded in an epoxy resin, and after mechanical polishing, a surface treatment was performed by use of an ion milling method. Then, an observation was conducted using a backscattered electron image at a magnification of 30000 times obtained with FE-SEM (JSM-7800F manufactured by JEOL). Porosity was measured by binarizing ceramic portions and the resin in the captured SEM image (using image processing software: Image-ProPlus).

The porosity of the topmost layer (A), the porosity of the supporting layer (B), and the ratio (A/B) of the porosity of the topmost layer (A) to the porosity of the supporting layer (B) are shown in Table 1.

Thickness Measurement of Supporting Layer, Topmost Layer, Compound Layer and Separation Membrane As discussed below, the thickness of the supporting layer, the topmost layer, the compound layer and the separation membrane were measured.

Firstly the arithmetic average of the measurement values at three equidistant positions on the SEM image used in the porosity measurement was taken to be the thickness of each layer and the separation membrane.

The thickness of the topmost layer (C), the thickness of the supporting layer (D), and the ratio (C/D) of the thickness of the topmost layer (C) to the thickness of the supporting layer (D), the thickness of the compound layer and the thickness of the separation membrane are shown in Table 1.

$CO_2$ Permeation Amount Measurement

A mixed gas ($CO_2$:$CH_4$=50 vol %:50 vol %, partial pressure of each gas: 0.3 MPa) of $CO_2$ (carbon dioxide) and $CH_4$ (methane) was supplied into the cells of each sample, and the permeation amount of the gas that permeated the separation membrane structure was measured using a gas flow meter to thereby calculate the $CO_2$ permeation amount. The calculation results are shown in Table 1.

Measurement of Pressure Resistance Strength

Water was allowed to flow into the cells of each sample and pressure was applied to thereby measure the internal pressure fracture strength (pressure resistance strength) at which the separation membrane structure fractured. The measurement results are shown in Table 1.

TABLE 1

| Sample No. | Topmost Layer Material | Supporting Layer Material | Topmost Layer Porosity (A)% | Supporting Layer Porosity (B)% | Porosity Ratio (A/B) | Topmost Layer Thickness (C) μm | Supporting Layer Thickness (D) μm | Membrane Thickness Ratio (C/D) | Compound Layer Thickness μm | Separation Membrane | Separation Membrane Thickness μm | $CO_2$ Permeation Amount L/min·m² | Pressure Resistance Strength Mpa |
|---|---|---|---|---|---|---|---|---|---|---|---|---|---|
| 1 | alumina | alumina | 38 | 27 | 1.40 | 0.5 | 20 | 0.025 | 0.1 | zeolite | 1 | 201 | 21 |
| 2 | alumina | alumina | 42 | 27 | 1.55 | 1 | 20 | 0.050 | 0.1 | zeolite | 1 | 220 | 20.5 |
| 3 | alumina | alumina | 48 | 27 | 1.77 | 2 | 20 | 0.100 | 0.1 | zeolite | 1 | 259 | 20 |
| 4 | alumina | alumina | 38 | 12 | 3.16 | 0.5 | 20 | 0.025 | 0.1 | zeolite | 1 | 190 | 26.0 |
| 5 | alumina | alumina | 42 | 12 | 3.50 | 1 | 20 | 0.050 | 0.1 | zeolite | 1 | 205 | 25.8 |
| 6 | alumina | alumina | 48 | 12 | 4.00 | 2 | 20 | 0.100 | 0.1 | zeolite | 1 | 240 | 24.9 |
| 7 | alumina | alumina | 30 | 12 | 2.50 | 0.5 | 20 | 0.025 | 0.1 | zeolite | 1 | 170 | 28 |
| 8 | alumina | alumina | 38 | 35 | 1.08 | 0.5 | 20 | 0.025 | 0.1 | zeolite | 1 | 230 | 19.2 |
| 9 | alumina | alumina | 42 | 35 | 1.20 | 1 | 20 | 0.050 | 0.1 | zeolite | 1 | 255 | 19 |
| 10 | alumina | alumina | 48 | 35 | 1.37 | 2 | 20 | 0.100 | 0.1 | zeolite | 1 | 293 | 18.5 |
| 11 | alumina | alumina | 48 | 42 | 1.14 | 0.5 | 20 | 0.025 | 0.1 | zeolite | 1 | 350 | 16.9 |
| 12 | alumina | alumina | 38 | 27 | 1.40 | 0.5 | 30 | 0.017 | 0.1 | zeolite | 1 | 200 | 22.5 |
| 13 | alumina | alumina | 38 | 27 | 1.40 | 1 | 30 | 0.033 | 0.1 | zeolite | 1 | 200 | 21.9 |
| 14 | alumina | alumina | 38 | 27 | 1.40 | 2 | 30 | 0.067 | 0.1 | zeolite | 1 | 198 | 21.6 |
| 15 | alumina | alumina | 38 | 27 | 1.40 | 20 | 30 | 0.667 | 0.1 | zeolite | 1 | 180 | 20.3 |
| 16 | alumina | alumina | 38 | 27 | 1.40 | 0.5 | 10 | 0.050 | 0.1 | zeolite | 1 | 210 | 19.5 |
| 17 | alumina | alumina | 38 | 27 | 1.40 | 1 | 10 | 0.100 | 0.1 | zeolite | 1 | 208 | 19.1 |
| 18 | alumina | alumina | 38 | 27 | 1.40 | 2 | 10 | 0.200 | 0.1 | zeolite | 1 | 208 | 19 |
| 19 | alumina | alumina | 38 | 27 | 1.40 | 9 | 10 | 0.900 | 0.1 | zeolite | 1 | 203 | 18.1 |
| 20 | alumina | alumina | 38 | 27 | 1.40 | 20 | 100 | 0.200 | 0.1 | zeolite | 1 | 180 | 25 |
| 21 | alumina | alumina | 38 | 27 | 1.40 | 20 | 250 | 0.080 | 0.1 | zeolite | 1 | 175 | 28 |
| 22 | alumina | alumina | 35 | 27 | 1.29 | 0.1 | 20 | 0.005 | 0.1 | zeolite | 1 | 198 | 20.2 |
| 23 | alumina | alumina | 38 | 27 | 1.40 | 0.5 | 20 | 0.025 | 0.2 | zeolite | 1.5 | 180 | 20.1 |
| 24 | alumina | alumina | 38 | 27 | 1.40 | 0.5 | 20 | 0.025 | 0.5 | zeolite | 2 | 170 | 20.1 |
| 25 | alumina | alumina | 48 | 27 | 1.77 | 0.5 | 20 | 0.025 | 1 | zeolite | 2.5 | 151 | 20.1 |
| 26 | titania | alumina | 40 | 27 | 1.48 | 0.5 | 20 | 0.025 | 0.1 | zeolite | 1 | 210 | 20.8 |
| 27 | zirconia | alumina | 38 | 27 | 1.40 | 0.5 | 20 | 0.025 | 0.2 | zeolite | 1 | 200 | 19.5 |
| 28 | mullite | alumina | 48 | 27 | 1.77 | 3 | 20 | 0.150 | 1 | zeolite | 2.3 | 177 | 19.9 |
| 29 | alumina | alumina | 38 | 27 | 1.40 | 0.5 | 20 | 0.025 | 0.2 | silica | 0.3 | 152 | 21 |
| 30 | alumina | alumina | 38 | 27 | 1.40 | 0.5 | 20 | 0.025 | 0.2 | carbon | 0.3 | 380 | 20.9 |
| 31 | alumina | alumina | 20 | 27 | 0.74 | 1 | 20 | 0.050 | 0.1 | zeolite | 1 | 110 | 20.2 |
| 32 | alumina | alumina | 27 | 38 | 0.71 | 1 | 20 | 0.050 | 0.1 | zeolite | 1 | 150 | 16.9 |
| 33 | alumina | alumina | 38 | 27 | 1.40 | 15 | 10 | 1.500 | 0.1 | zeolite | 1 | 190 | 15.8 |
| 34 | alumina | alumina | 20 | 27 | 0.74 | 0.5 | 20 | 0.025 | 0.2 | silica | 0.3 | 80 | 20.3 |
| 35 | alumina | alumina | 20 | 27 | 0.74 | 0.5 | 20 | 0.025 | 0.2 | carbon | 0.3 | 200 | 20.3 |

As shown in Table 1, in relation to Sample Nos. 1 to 28 and 31 to 33 in which the separation membrane was configured as a zeolite membrane, Sample Nos. 1 to 28 exhibited a ratio (A/B) of the porosity of the topmost layer to the porosity of the supporting layer that was greater than or equal to 1.08, and a ratio (C/D) of the thickness of the topmost layer to the thickness of the supporting layer that was less than or equal to 0.9 and therefore obtained superior results in relation to both $CO_2$ permeation amount and pressure resistance strength when compared to Sample Nos. 31 to 33.

In the same manner, in relation to Sample Nos. 29 and 34 in which the separation membrane was configured as a silica membrane, Sample No. 29 exhibited a ratio (A/B) of the porosity of the topmost layer to the porosity of the supporting layer of 1.40, and a ratio (C/D) of the thickness of the topmost layer to the thickness of the supporting layer of 0.025 and therefore obtained superior results in relation to both $CO_2$ permeation amount and pressure resistance strength when compared to Sample No. 34.

In the same manner, in relation to Sample Nos. 30 and 35 in which the separation membrane was configured as a carbon membrane, Sample No. 30 exhibited a ratio (A/B) of the porosity of the topmost layer to the porosity of the supporting layer of 1.40, and a ratio (C/D) of the thickness of the topmost layer to the thickness of the supporting layer of 0.025 and therefore obtained superior results in relation to both $CO_2$ permeation amount and pressure resistance strength when compared to Sample No. 35.

The above results were obtained due to the fact a porosity ratio (A/B) of greater than or equal to 1.08 enabled an increase in the number of passages for $CO_2$ flow from the separation membrane to the topmost layer, and a thickness ratio (C/D) of less than or equal to 0.9 maintained the strength of the supporting layer that supports the topmost layer.

Furthermore, as shown in Table 1, of Sample Nos. 1 to 28, a porosity ratio (A/B) of greater than or equal to 2.5 in Sample Nos. 4 to 7 enabled a further improvement in the pressure resistance strength.

Furthermore, as shown in Table 1, of Sample Nos. 1 to 28, the porosity (A) of greater than or equal to 38% and porosity (B) of greater than or equal to 35% in Sample No. 8 to 11 enabled a further improvement in the $CO_2$ permeation amount.

The invention claimed is:
1. A separation membrane structure comprising:
a porous support including a base body, a topmost layer, and a supporting layer, the supporting layer being disposed between the base body and the topmost layer and making contact with the topmost layer, and
a separation membrane formed on the topmost layer, wherein
a ratio of a porosity of the topmost layer to a porosity of the supporting layer is greater than or equal to 1.08,
a ratio of a thickness of the topmost layer to a thickness of the supporting layer is less than or equal to 0.9, an average pore diameter of the topmost layer is greater than an average pore diameter of the supporting layer, and the average ore diameter of the supporting layer is smaller than an average pore diameter of the base body.

2. The separation membrane structure according to claim 1, wherein the ratio of the porosity of the topmost layer to the porosity of the supporting layer is less than or equal to 1.40.

* * * * *